US006950986B1

(12) United States Patent
Jacobi, Jr. et al.

(10) Patent No.: US 6,950,986 B1
(45) Date of Patent: *Sep. 27, 2005

(54) SIMULTANEOUS DISPLAY OF A CODED MESSAGE TOGETHER WITH ITS TRANSLATION

(75) Inventors: James J. Jacobi, Jr., Ponte Verde Beach, FL (US); Alexis Siroc, Cornwall, NY (US); G. Bruce Johnson, Cornwall-on-Hudson, NY (US)

(73) Assignee: North River Consulting, Inc., Ponte Vedra Beach, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 621 days.

(21) Appl. No.: 08/763,277

(22) Filed: Dec. 10, 1996

(51) Int. Cl.[7] .......................... G06F 15/00; G09B 21/00; B42D 15/00
(52) U.S. Cl. ..................... 715/520; 715/500; 434/112; 283/117; D18/32
(58) Field of Search ................................ 345/435, 113, 345/467, 471, 472, 472.1, 472.2; 283/46, 17; 434/117, 159, 160, 113

(56) References Cited

U.S. PATENT DOCUMENTS

| | | | | |
|---|---|---|---|---|
| 1,244,000 A | * | 10/1917 | Soltoft | 434/159 |
| D137,303 S | * | 2/1944 | Daily | D18/27 |
| 3,858,333 A | * | 1/1975 | Kopp | 434/113 |
| D255,693 S | * | 7/1980 | Bombarger, Jr. | D18/27 |
| 4,286,323 A | * | 8/1981 | Meday | 364/411 |
| 4,315,748 A | * | 2/1982 | Frascara et al. | 434/159 |
| 4,404,764 A | * | 9/1983 | Wills et al. | 434/159 |
| 4,425,627 A | * | 1/1984 | Eibner | 345/354 |
| 4,878,844 A | * | 11/1989 | Gasper et al. | 40/124.1 |
| 5,275,567 A | * | 1/1994 | Whitfield | 434/133 |
| 5,357,601 A | * | 10/1994 | Kagawa | 345/435 |
| 5,487,106 A | * | 1/1996 | Kenmochi et al. | 379/100.62 |
| 5,513,993 A | * | 5/1996 | Lindley et al. | 347/319 |
| 5,779,482 A | * | 7/1998 | Fukumoto | 434/113 |
| 5,782,640 A | * | 7/1998 | Sandlin | 283/46 X |

OTHER PUBLICATIONS

Using WordPerfect 5.1, Que Corporation, pp. 723–725, 894–895, 1994.*
"Power Point 4 for Windows for Dummies", Doug Lowe Published by IDG Books, Insidecovers, pp. , 75, 309, Mar. 18, 1994.*
"Clinical Chemistry Theory, Analysis and Correlation", L. Kaplan et al Periodic Table, 1984.*
"Microsoft Word Using Microsoft Word", Microsoft Press Version 5.0 pp. xvi, 67, 405–415, 1989.*
"Periodic Table of the Elements", Paper Tech ISBN 1–55080–073–6 T.K. Varga et al., 1999.*
Bell Atlantic, C & P Telephone Yellow Pages, p. 1097, 1995.*

* cited by examiner

*Primary Examiner*—T. D. Ingberg
(74) *Attorney, Agent, or Firm*—Paul J. Sutton; Barry G. Magidoff

(57) ABSTRACT

A system and method for presenting a simultaneous, overlapping display of a coded message and its translation as a single, integrated graphic presentation in any visual medium, that provides quick and full comprehension. It may be used advantageously, for example, to provide an immediate translation of telephone numbers displayed as letters or words in advertising, wherein the letters correspond to numerals found on a telephone keypad or rotary dial.

7 Claims, 29 Drawing Sheets

| | | | | |
|---|---|---|---|---|
| A | = | •— | N | = | —• |
| B | = | —••• | O | = | • • |
| C | = | •• • | P | = | ••••• |
| D | = | —•• | Q | = | ••—• |
| E | = | • | R | = | • •• |
| F | = | •—• | S | = | ••• |
| G | = | ——• | T | = | — |
| H | = | •••• | U | = | ••— |
| I | = | •• | V | = | •••— |
| J | = | —•—• | W | = | •—— |
| K | = | —•— | X | = | •—•• |
| L | = | — | Y | = | •• •• |
| M | = | —— | Z | = | ••• • |

FIG. 1

| | | | | | | | | |
|---|---|---|---|---|---|---|---|---|
| A | = | ă | H | = | h | R | = | r |
| A | = | ā | I | = | ĭ | S | = | s |
| A | = | âr | I | = | ī | S | = | zh |
| A | = | ä | I | = | îr | T | = | t |
| A | = | ə | I | = | ə | U | = | ŭ |
| B | = | b | J | = | j | U | = | ûr |
| C | = | k | K | = | k | U | = | ə |
| D | = | d | L | = | l | V | = | v |
| E | = | ĕ | M | = | m | W | = | w |
| E | = | ē | N | = | n | X | = | z |
| E | = | ə | O | = | ŏ | Y | = | y |
| E | = | ər | O | = | ō | Z | = | z |
| F | = | f | O | = | ô | | | |
| G | = | g | O | = | ə | | | |
| G | = | j | P | = | p | | | |
| G | = | zh | Q | = | kyo͞o | | | |

FIG. 2

| | | | | | |
|---|---|---|---|---|---|
| A | or | B | or | C | = 2 |
| D | or | E | or | F | = 3 |
| G | or | H | or | I | = 4 |
| J | or | K | or | L | = 5 |
| M | or | N | or | O | = 6 |
| P | or | R | or | S | = 7 |
| T | or | U | or | V | = 8 |
| W | or | X | or | Y | = 9 |

FIG. 3 y/x
x/z
b/x
a/b
y/a
y/e
e/a
e/z

Grid 1  $B_2, C_2, D_3, G_4, H_4, N_6,$
$O_6, P_7, R_7, S_7, T_8, U_8$

Grid 2  $A_2, K_5, V_8, X_9, Y_9$

Grid 3  $E_3, F_3, J_5, L_5$ $4_4$

Grid 4  $2_2, 3_3, 5_5, 6_6, 7_7, 8_8, 9_9, 0_0$

Grid 5  $I_4$ $1_1$

Grid 6     $M_6$

Grid 7     $W_9$ 1-800-C$_2$A$_2$L$_5$L$_5$ A$_2$T$_8$T$_8$

FIG. 22B 1-800-PEANUTS
1-800-7326887

FIG. 23A 1-800-PEANUTS
1-800-7326887

FIG. 23B

Franklin Gothic

Helvetica

Univers

COMPARE
2 6 6 7 2 7 3

Extra Small Configuration

COMPARE
2 6 6 7 2 7 3

Small Configuration

COMPARE
2 6 6 7 2 7 3

Medium Configuration

COMPARE
2 6 6 7 2 7 3

Large Configuration

COMPARE
2 6 6 7 2 7 3

Extra Large Configuration

FIG. 40A

COMPARE
$C_2O_6M_6P_7A_2R_7E_3$

Extra Small Configuration - shown at 12 pt

COMPARE
$C_2O_6M_6P_7A_2R_7E_3$

Small Configuration - shown at 20 pt

COMPARE
$C_2O_6M_6P_7A_2R_7E_3$

Medium Configuration - shown at 33 pt

COMPARE
$C_2O_6M_6P_7A_2R_7E_3$

Large Configuration - shown at 44 pt

COMPARE
$C_2O_6M_6P_7A_2R_7E_3$

Extra Large Configuration - shown at 60 pt

SIMULTANEOUS DISPLAY OF A CODED MESSAGE TOGETHER WITH ITS TRANSLATION

BACKGROUND OF THE INVENTION

Codes—the use of symbols to represent letters and numbers to transmit messages—have been used for centuries. Among the most common of these codes are Morse code, in which letters and numbers are represented by various sequences of dots and dashes (see FIG. 1); phonetic codes, in which letters are represented by symbols, each designating a single sound (see FIG. 2); and the telephone dialing code, in which letters are represented by corresponding numerals (see FIG. 3).

The norm is to display a code separate from its translation. Simultaneous, overlapping display of both is unusual. For example, when using the telephone dialing code, 1-800-CALL ATT, a service mark of the AT&T CORPORATION, for telephone services is most often displayed separate from, or without, the numeric translation, 1-800-225-5288. While presentation of the telephone number as a mnemonic device (i.e., numerals converted to letters, often spelling memorable words) is intended to aid in the recall of the telephone number, the presentation of letters rather than numerals actually makes it more difficult to correctly dial the telephone number, since telephone dialing instruments—rotary dial or keypad—are number dominant.

This fact points out a major drawback to displaying codes separate from their translations if the intent is quick and full comprehension. Extra steps are required to decipher the code, which can also lead to errors in the translation. While the use of the telephone dialing code to present telephone numbers is on the rise among advertisers, so too is the incidence of misdialing these numbers and the attendant annoyance of telephone callers forced to "hunt and peck" which constitutes a change in their normal method of dialing a telephone number.

SUMMARY OF THE INVENTION

The present invention overcomes these and other disadvantages by providing a system and method for presenting a simultaneous, overlapping display of the coded message and its translation as a single, integrated graphic presentation, in any visual medium. A proportionate relationship is maintained between the individual characters in the translation and the individual symbols in the code, in order not only to maximize visibility, but also to minimize any tendency of either the characters of the translation or the symbols of the code to completely or partially obscure the other.

BRIEF DESCRIPTION OF THE DRAWINGS

Figure 1:
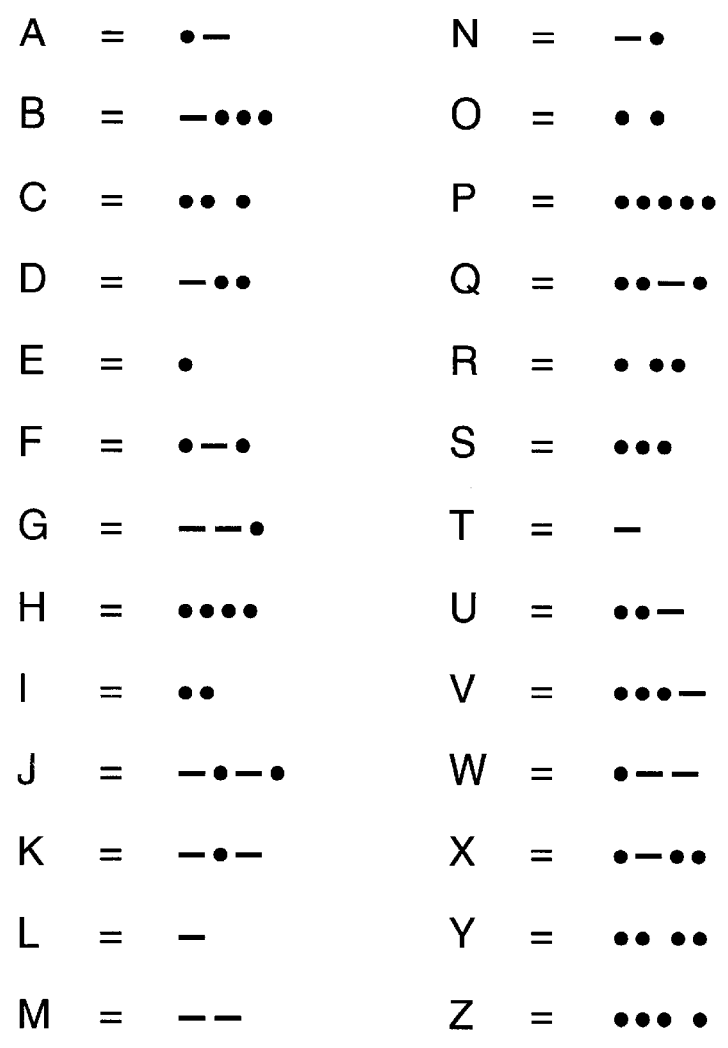

FIG. 1 is a diagram of a prior art system for American Morse code, equating dots and dashes with letters;

FIG. 2 is a diagram of a prior art system for a partial phonetic code, equating symbols for pronunciation with letters;

FIG. 3 is a diagram of a prior art system for the telephone dialing code, equating numerals and letters that appear on standard telephone dialing instruments;

FIG. 21A is a diagram of the present invention as it is used to display a simultaneous numerical translation of the mnemonic telephone number "1-800-CALL ATT[SM] telephone services;"

FIG. 21B is a diagram of the present invention as it is used to display a simultaneous numerical translation of the mnemonic telephone number "1-800-CALL ATT$^{SM}$ telephone services" without grids visible;

FIG. 22A is a diagram of the present invention as it is used to display a simultaneous numerical translation of the mnemonic telephone number "1-800-321-CITI$^{SM}$ a service mark of Citibank Corporation for banking services;"

FIG. 22B is a diagram of the present invention as it is used to display a simultaneous numerical translation of the mnemonic telephone number "1-800-321-CITI$^{SM}$ banking services" without grids visible;

FIG. 23A is a diagram of the present invention as it is used to display a simultaneous numerical translation of the mnemonic telephone number "1-800-PEANUTS;"

FIG. 23B is a diagram of the present invention as it is used to display a simultaneous numerical translation of the mnemonic telephone number "1-800-PEANUTS" without grids visible;

FIG. 40A is a diagram of the present invention as it is used to display—in five different configurations—a simultaneous numerical translation of the word "COMPARE" corresponding to the telephone dialing code. The uppercase letters are presented at the same point size in each configuration;

FIG. 40B is a diagram of the present invention as it is used to display—in five different configurations—a simultaneous numerical translation of the word "COMPARE" corresponding to the telephone dialing code. The uppercase letters are presented at a point size advantageous to each configuration;

FIG. 42A is a diagram of the present invention as it is used to display a simultaneous numerical translation of the mnemonic telephone number "1-800-MILLER 6;"

FIG. 42B is a diagram of the present invention as it is used to display a simultaneous numerical translation of the mnemonic telephone number "1-800-YES 2 ATT."

DETAILED DESCRIPTION OF THE PREFERRED EMBODIMENTS

Figure 4:
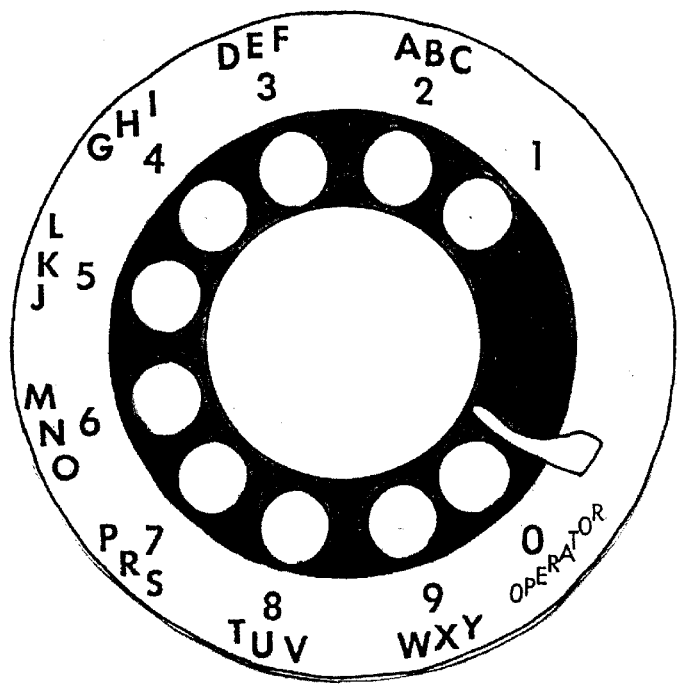
FIG. 4 is a diagram of a prior art rotary dial for a telephone.
Figure 5:
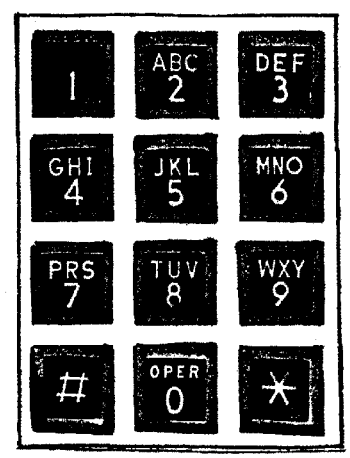
FIG. 5 is a diagram of a prior art touch-tone keypad for a telephone.
Figure 6:
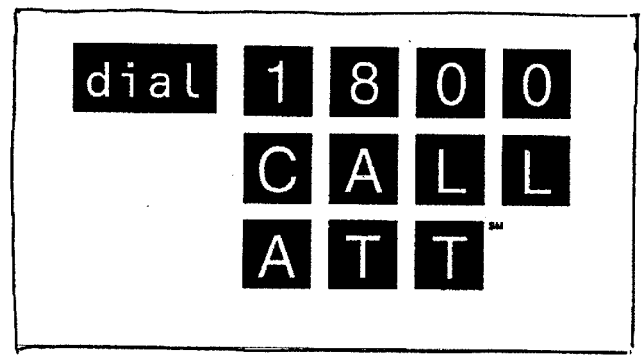
FIGS. 6 and 7 are diagrams of prior art mnemonic devices used to display telephone numbers, where letters are used to represent numerals on a telephone dialing instrument.
Figure 7:
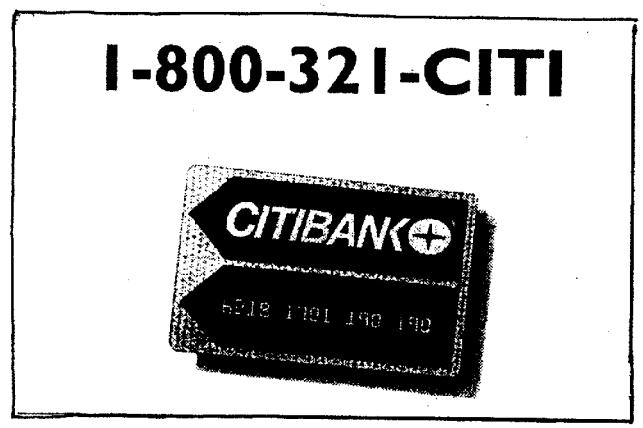
Figure 8:
FIG. 8 is a diagram of a prior art mnemonic device used to display a telephone number, where letters are used to represent numerals on a telephone dialing instrument, and a separate numeric translation is also provided.

This invention is applicable to any visual medium that could possibly be used to display a coded message. Obvious examples would include, but not be limited to, uses in print media (stationery items such as business cards and letterhead; collateral material such as brochures; advertisements in newspapers, telephone directories, magazines, direct mail, as well as on posters and billboards; novelty advertising such as keychains, coffee mugs, T-shirts, even blimps or hot-air balloons); as well as electronic media (advertisements shown on videotape or film presented on television or in a movie theater; messages shown as liquid crystal displays (LCD) on telephone pagers; lighted displays on electronic billboards; and computer presentations displayed either on the computer screen or projected onto another surface).

Further, this invention is applicable in any visual medium, as noted above, to accommodate the translation of a coded message at any size normally used to display the message. To accommodate the broad range of sizes at which coded messages could be presented, this invention designates different "configurations" (referred to herein and in the drawings) that relate to the size of the characters within the first display area (see FIG. 9). For example, if the characters within the first display area were specified to be 33 point type (approximately ⅜ inch in height) when viewed from a normal reading distance of approximately 18 inches, the Medium Configuration would provide the optimum presentation for the simultaneous display of the coded message together with its translation.

In addition to the Medium Configuration (which has the broadest range of use) there are four other configurations: Extra Small, Small, Large, and Extra Large. The Medium Configuration is used in all the drawings unless otherwise noted. Following is a chart that can be used to determine the appropriate configuration for any simultaneous display of a coded message together with its translation. Examples of the five configurations are shown in FIGS. 40A and 40B.

Approximate Size of Characters in First Display Area as if Viewed from 18 Inches

| Configuration | Range of Sizes |
| --- | --- |
| Extra Small | 8 point to 18 point |
| Small | 14 point to 24 point |
| Medium | 18 point to 720 point |
| Large | 40 point to 720 point |
| Extra Large | 54 point to 720 point |

100 point type is approximately 1 inch

While many visual displays have an anticipated optimum viewing distance greater than 18 inches—highway signs, billboards, posters, television and movie screens, blimps and hot-air balloons, to name only a few—the chart shown above remains an accurate guide to selecting the appropriate configuration for the simultaneous display of a coded message together with its translation. For example, calculations would need to be done to determine the optimum absolute size of a message viewed from a particular distance (e.g., a highway billboard) to achieve the perception that the relative size of that message was equal to the absolute size of another message (e.g., a magazine advertisement) viewed from a distance of approximately 18 inches.

Figure 41A:
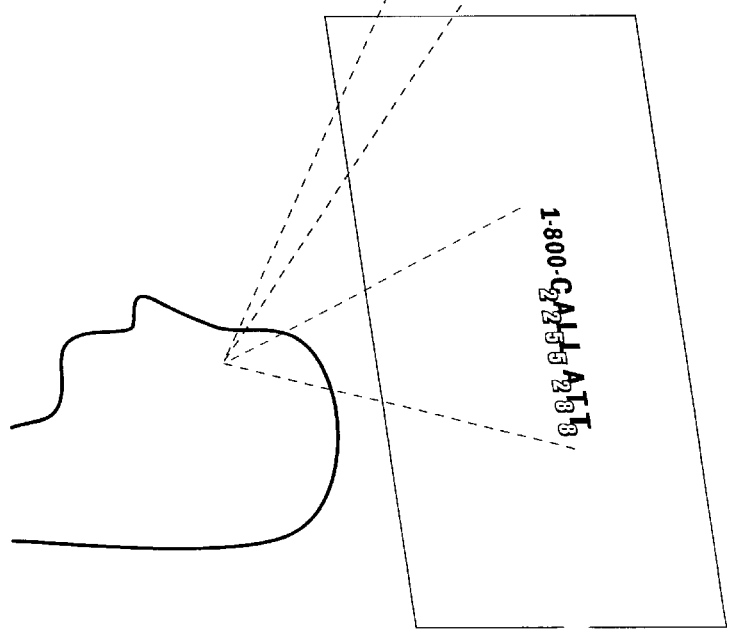
FIG. 41A is a diagram of the present invention as it is used to display a simultaneous translation of the mnemonic telephone number "1-800-CALL ATT$^{SM}$" telephone services," shown in the Extra Small Configuration on a billboard when viewed at long range and on a magazine when viewed at short range, as to appear the same size to the viewer.
Figure 41B:
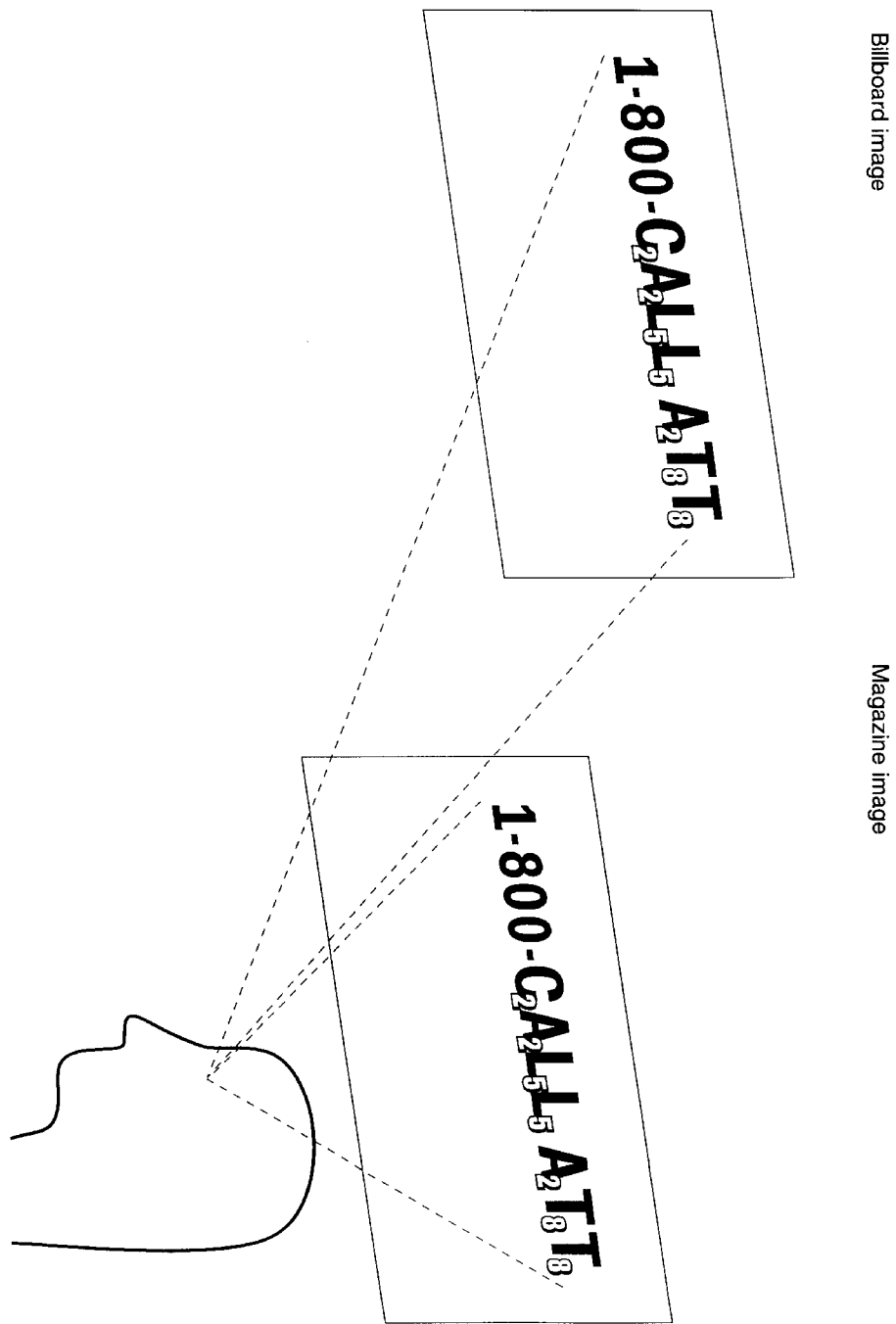
FIG. 41B is a diagram of the present invention as it is used to display a simultaneous translation of the mnemonic telephone number "1-800-CALL ATT$^{SM}$" telephone services," shown in the Medium Configuration on a billboard when viewed at long range and on a magazine when viewed at short range, as to appear the same size to the viewer.

Thus, the "configurations" referred to in FIGS. 40A and 40B refer to equivalent or relative sizes; the absolute sizes being dependent upon the distance at which a message is intended to be viewed. This is illustrated in FIGS. 41A and 41B.

Figure 38:
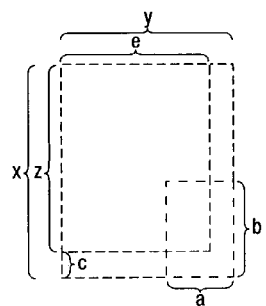
FIG. 38 is a diagram of the present invention as it is used to display the modification of an uppercase letter "A" in each of three different sans serif typefaces while maintaining the principal characteristics of each font style. The far left column presents the normal presentation of the letter only, the middle column presents a modification of the letter whereby the width is reduced proportionally to its height to fit within the pre-set borders of the first display area, and finally the far right column presents a further modification of the letter by overlapping a small numeral "2," the corresponding character in the telephone dialing code.
Figure 38:
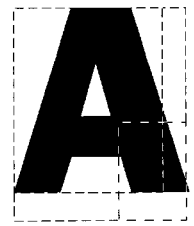
Figure 38:
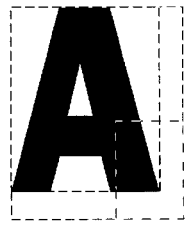
Figure 38:
Figure 38:
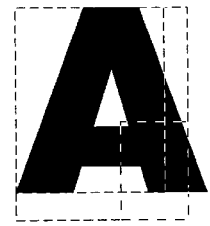
Figure 38:
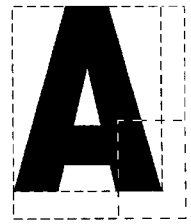
Figure 38:
Figure 38:
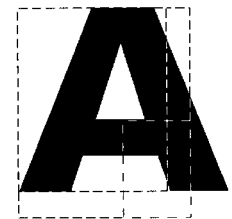
Figure 38:
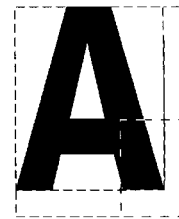
Figure 38:
Figure 39:
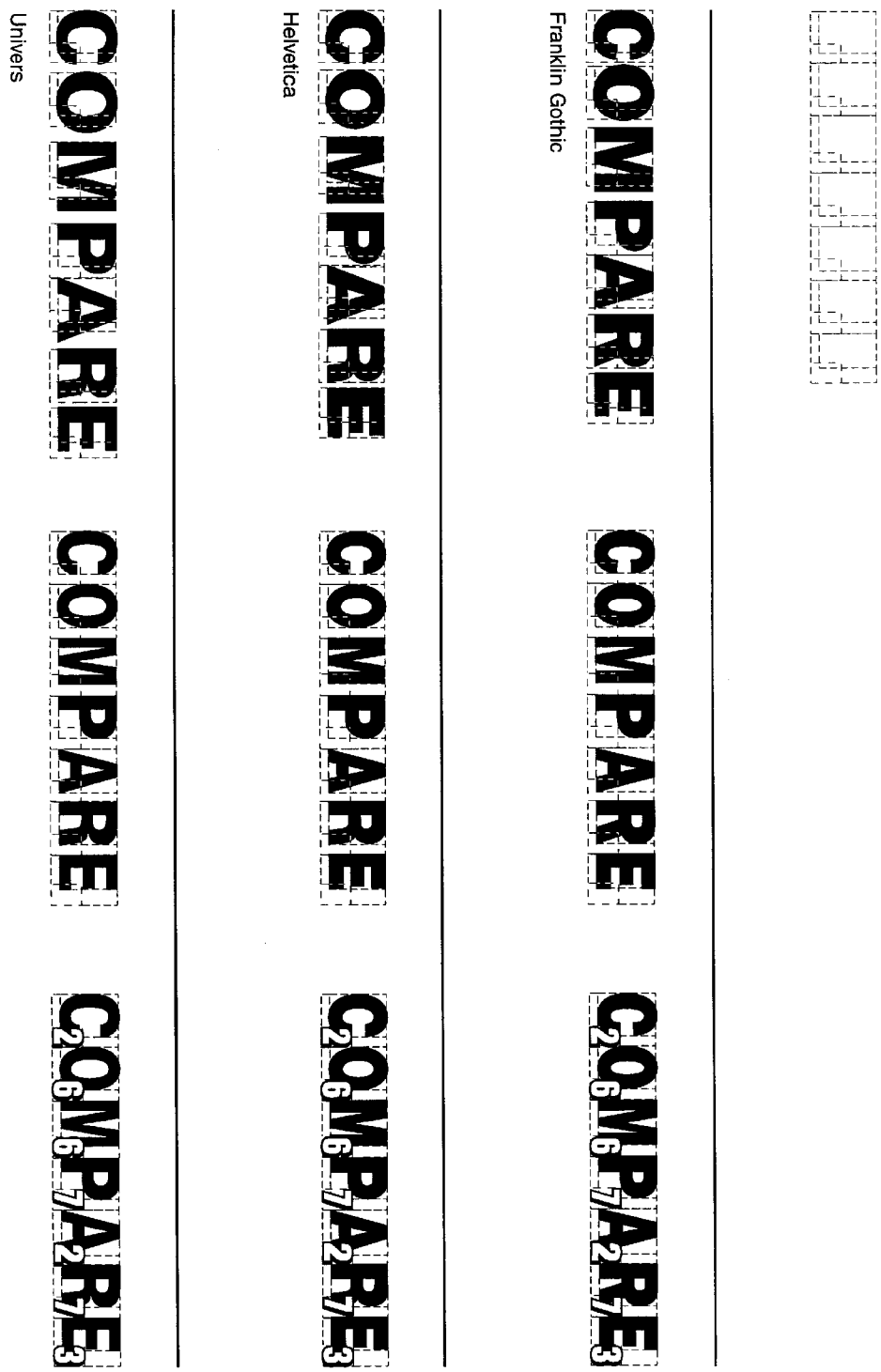
FIG. 39 is a diagram of the present invention as it is used to display the modification of the word "COMPARE" constructed of uppercase letters in three different sans serif typefaces while maintaining the principal characteristics of each font style. The far left column presents the normal presentation of the word in each typeface, the middle column presents a modification of the word in each typeface whereby the width of each letter is reduced proportionally to its height to fit within the pre-set borders of the first display area, and finally the far right column presents a further modification of the word by overlapping each modified letter with the small numeral that corresponds to it in the telephone dialing code.

As is shown by the several drawings, this invention is applicable to both serif and sans serif font styles. In addition, specific font styles may be modified to accurately represent the system of the invention. For example, as shown in FIG. 38, if the characters of a specific font style have a relatively greater width than is preferred for use in this invention, the width of the characters to be modified would be reduced proportionally to their height so as to fit within pre-set borders of the first display area. As shown in FIGS. 38 and 39, the other principal characteristics of each font style are maintained.

Turning now to the drawings, wherein like reference numerals refer to like elements, FIGS. 1–8 depict the prior art with its various disadvantages. The present invention is described beginning in FIG. 9, with its improvements over the prior art.

A discussion of the invention may best begin with a discussion of letter and numeral displays. It has been empirically determined that, in the event of simultaneous display of two types of characters, such as letters and corresponding numerals, the particular size, shape, weight, color and relational information of the characters is important to the visibility and comprehension of the entire message.

One embodiment of the present invention is the simultaneous display of relatively large uppercase, sans serif, roman letters and relatively smaller Arabic numerals overlapped, in order to provide an immediate translation of information found on a telephone keypad or rotary dial. In this embodiment, which could be laid out using a grid such as that shown in FIG. 9, the lighter shaded first display area surrounded by the borders, having dimensions herein labeled "e" and "z," are normally used for displaying a letter. The smaller and darker shaded second display area, surrounded by the borders having dimensions labeled "a" and "b," are normally used for displaying a numeral corresponding to the letter on a telephone keypad or rotary dial. The outer borders which contain both display areas, having dimensions labeled "y" and "x," define the overall display "field" for both characters, i.e., letter and numeral.

Figure 9:
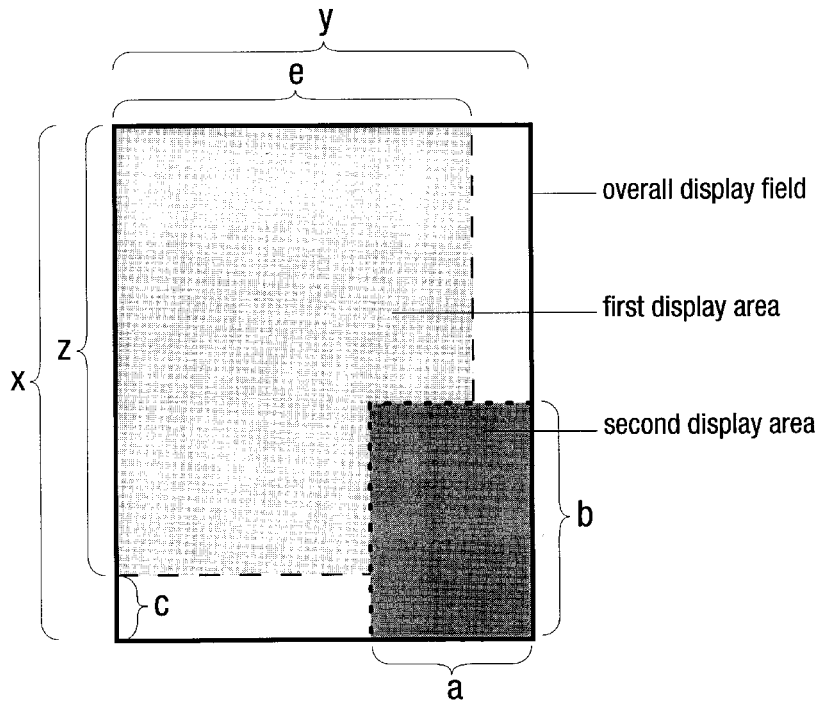
FIG. 9 is a diagram of the present invention showing overlapping display areas within an overall display field, and defined mathematical relationships between some of these areas.

FIG. 9 shows an outline of the proportional relationship between the characters. The overall display field for the defined characters, defined by "y" and "x," preferably is a quadrilateral, most preferably having opposed parallel sides, namely a parallelogram. The first and second display areas, defined herein by "e" and "z," and "a" and "b," respectively, are geometrically similar to the overall field, and are usually overlapping. One pair of each of the sides, "e," "z," "a," "b," is coextensive with portions of opposing sides "y" and "x" respectively. For alphanumeric characters, the numeral in this embodiment is normally displayed as a smaller character within the second display area located in the lower right-hand quadrant of the overall display field.

Figure 10:
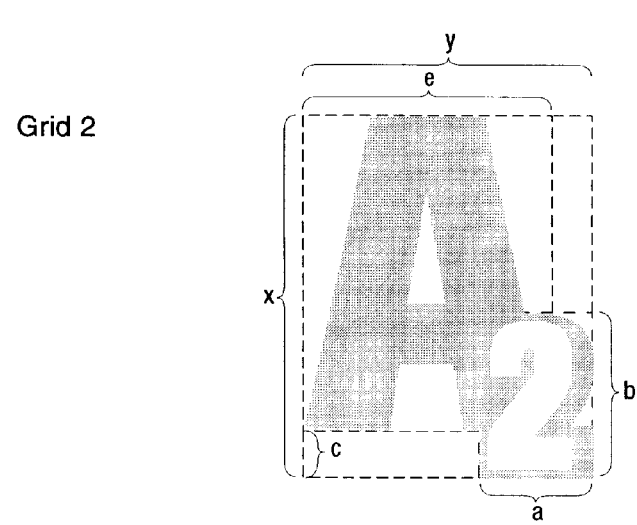
FIG. 10 is a diagram of the present invention as it is used to display an uppercase sans serif letter "A" overlapped by a small numeral "2," the corresponding character in the telephone dialing code.
Figure 11:
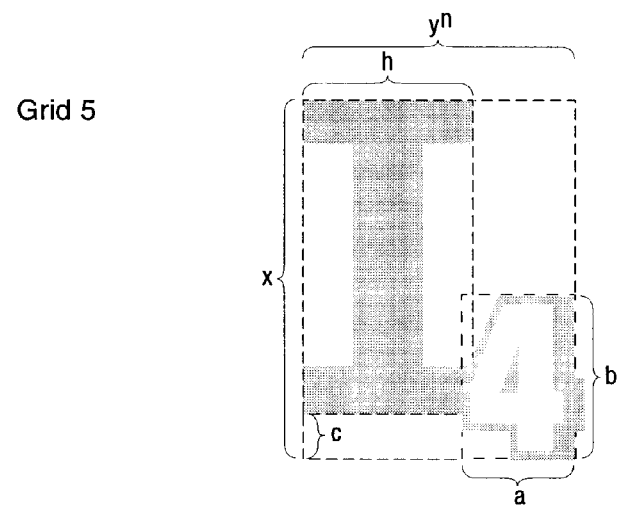
FIG. 11 is a diagram of the present invention as it is used to display an uppercase sans serif letter "I" overlapped by a small numeral "4," the corresponding character in the telephone dialing code.
Figure 12:
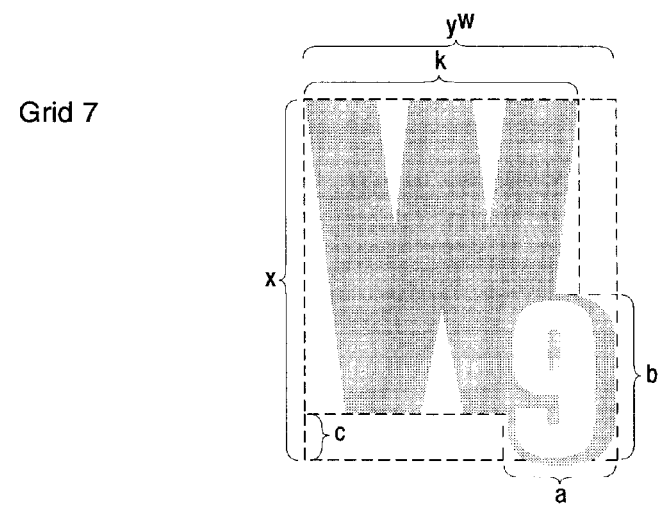
FIG. 12 is a diagram of the present invention as it is used to display an uppercase sans serif letter "W" overlapped by a small numeral "9," the corresponding character in the telephone dialing code.

The overall display field in this embodiment has a constant height, but three possible widths. Specific examples of alphanumeric characters are shown in FIGS. 10–12, each with an overall display field of a different width. Other grid ratios, as shown in succeeding figures, are optimized for other combinations of letters and numerals. As can be seen, the optimal ratios for each grid are different (except for the similarities to be discussed below) due to the fact that letters have different widths. The differences are minimized by the extent that a numeral overlaps a letter while still preserving the integrity of the letter form. For example, the letter "A" in FIG. 10 is optimally overlapped to a greater extent by the numeral "2" than is the letter "I" by the numeral "4" in FIG. 11, causing the difference in width between the two alphanumeric characters to be greatly reduced. This is critical when arranging the alphanumeric characters to form recognizable words, because optically equivalent spacing (letter to letter as well as numeral to numeral) provides optimum visibility and ease of comprehension.

Figure 34:
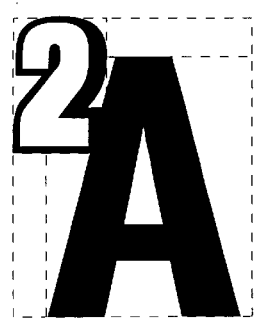
FIG. 34 is a diagram of the present invention as it is used to display an uppercase sans serif letter "A" with a smaller numeral "2" positioned in different quadrants about the letter.
Figure 34:
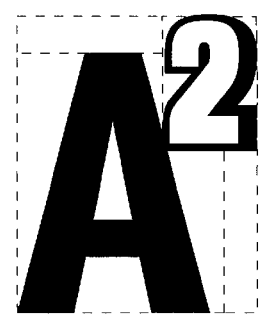
Figure 34:
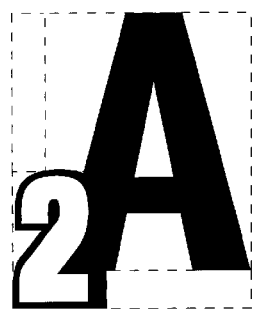
Figure 34:
Figure 35:
FIG. 35 is a diagram of a seventh embodiment of the present invention as it is used to display a large sans serif numeral "2" with a small uppercase, sans serif letter "A," the corresponding character in the telephone dialing code.
Figure 36:
FIG. 36 is a diagram of an eighth embodiment of the present invention as it is used to display a large American Morse code symbol "•—" with a small uppercase, sans serif letter "A," the corresponding alphabetic character.
Figure 37:
FIG. 37 is a diagram of a ninth embodiment of the present invention as it is used to display a large phonetic symbol, "ā," with a small uppercase, sans serif letter "A," the corresponding alphabetic character.

The present invention provides an entire system for systematically displaying and exhibiting, e.g., telephone dialing information, in uppercase, lowercase, italic, roman, positive, reverse, serif and sans serif formats, to maximize comprehension. It further has uses with combinations of characters other than the Latin alphabet and Arabic numerals. For example, for other alphabets, variations can be readily determined; when dealing with the Hebrew or Chinese alphabets, which are read right-to-left or vertically, the relative location of the smaller character may change, as in FIG. 34 where the relative positions of the letter and numeral are varied.

Some of the specific proportions empirically determined in the present invention to yield good visual results are set forth in FIGS. 13–19, which are also labeled as Grids 1–7 for sans serif typefaces. These drawings are substantially to scale, and can be measured to show the ratios used.

Figure 13:
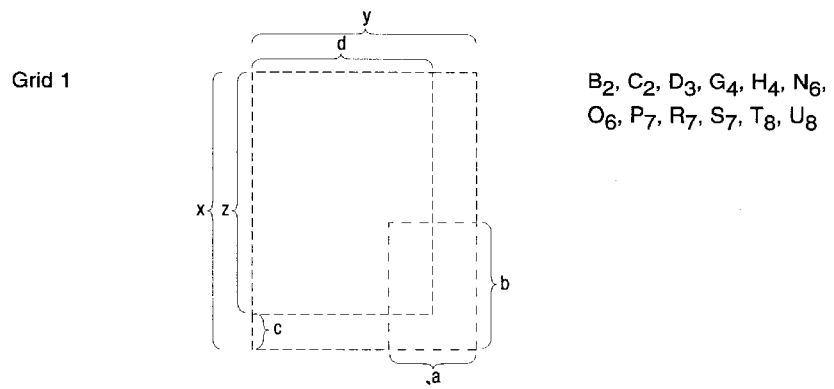
FIG. 13 is a diagram of the present invention as it may be used to display uppercase sans serif letters "B," "C," "D," "G," "H," "O," "P," "R," "S" "T," "U," and the small numerals that correspond to each in the telephone dialing code.

FIG. 13 (Grid 1) depicts a Medium Configuration grid suitable for displaying uppercase sans serif letters "B," "C," "D," "G," "H," "N," "O," "P," "R," "S," "T," "U" and the small numerals that correspond to each in the telephone dialing code. The following dimensions can be used, for example, in a poster advertisement:

y=3.60 cm
x=4.45 cm
d=2.90 cm
z=3.85 cm
a=1.40 cm
b=2.05 cm
c=0.55 cm

Preferred relative proportions of the grid dimensions labeled on FIG. 13 are as follows:

y/x=about 0.6 to about 1.1
x/z=about 0.9 to about 1.4
b/x=about 0.2 to about 0.7
a/b=about 0.5 to about 0.9
y/a=about 2.3 to about 2.8
y/d=about 1.0 to about 1.5
d/a=about 1.8 to about 2.3
d/z=about 0.5 to about 1.0

Figure 14:
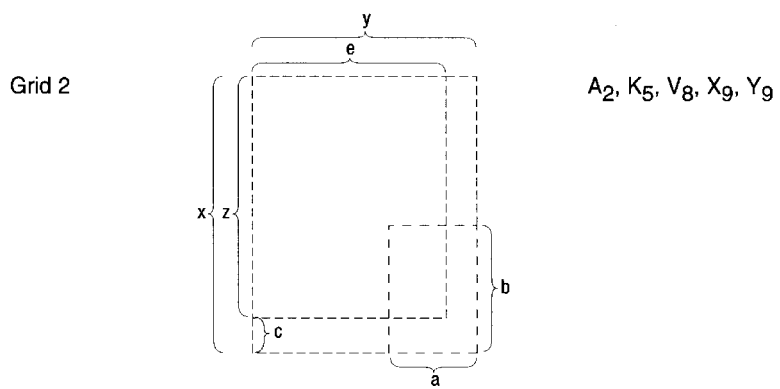
FIG. 14 is a diagram of the present invention as it may be used to display uppercase sans serif letters "A," "K," "V," "X," "Y" and the small numerals that correspond to each in the telephone dialing code.

FIG. 14 (Grid 2) depicts a Medium Configuration grid suitable for displaying uppercase sans serif letters "A," "K," "V," "X," "Y" and the small numerals that correspond to each in the telephone dialing code. The following dimensions can be used, for example, in a poster advertisement:

y=3.60 cm
x=4.45 cm
e=3.10 cm
z=3.85 cm
a=1.40 cm
b=2.05 cm
c=0.55 cm

Preferred relative proportions of the grid dimensions labeled on FIG. 14 are as follows:

y/x=about 0.6 to about 1.1
x/z=about 0.9 to about 1.4
b/x=about 0.2 to about 0.7
a/b=about 0.5 to about 0.9
y/a=about 2.3 to about 2.8
y/e=about 0.9 to about 1.4
e/a=about 2.0 to about 2.4
e/z=about 0.6 to about 1.0

Figure 15:
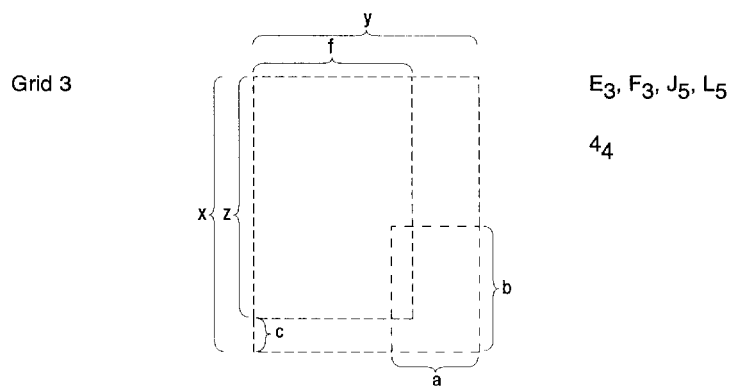
FIG. 15 is a diagram of the present invention as it may be used to display uppercase sans serif letters "E," "F," "J," "L" and the small numerals that correspond to each in the telephone dialing code, or to display a large sans serif numeral "4" along with a small numeral "4;"

FIG. 15 (Grid 3) depicts a Medium Configuration grid suitable for displaying uppercase sans serif letters "E," "F," "J," "L," a large sans serif numeral "4," and the small numerals that correspond to each in the telephone dialing code. The following dimensions can be used, for example, in a poster advertisement:

y=3.60 cm
x=4.45 cm
f=2.55 cm
z=3.85 cm
a=1.40 cm
b=2.05 cm
c=0.55 cm

Preferred relative proportions of the grid dimensions labeled on FIG. 15 are as follows:

y/x=about 0.6 to about 1.1
x/z=about 0.9 to about 1.4
b/x=about 0.2 to about 0.7
a/b=about 0.5 to about 0.9
y/a=about 2.3 to about 2.8
y/f=about 1.2 to about 1.6
f/a=about 1.6 to about 2.0
f/z=about 0.4 to about 0.9

Figure 16:
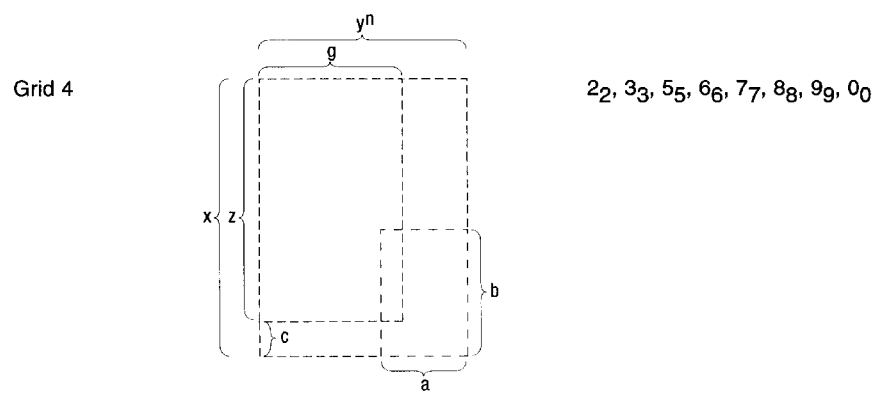
FIG. 16 is a diagram of the present invention as it may be used to display large sans serif numerals "2," "3," "5," "6," "7," "8," "9," "0," along with matching small numerals.

FIG. 16 (Grid 4) depicts a Medium Configuration grid suitable for displaying large sans serif numerals "2," "3," "4," "5," "6," "7," "8," "9," "0" along with matching small numerals. The following dimensions can be used, for example, in a poster advertisement:

$y^n$=3.40 cm
x=4.45 cm
g=2.30 cm
z=3.85 cm
a=1.40 cm
b=2.05 cm
c=0.55 cm

It will be noticed in FIG. 16 that the large numerals and the corresponding subscript numerals match. There are instances where this arrangement will be useful; for example, when displaying mnemonic telephone numbers, such as "1-800-MILLER 6" and "1-800-YES 2 ATT$^{SM}$ telephone services." (See FIGS. 42A and 42B.) It is obvious that the large numerals "6" and "2" do not, strictly speaking, require a translation. However, it has been empirically determined that the accurate translation of a mnemonic telephone number that has a large numeral preceded by a letter, or has a large numeral sandwiched between two letters, is made easier by displaying the large numeral with its matching subscript numeral.

Preferred relative proportions of the grid dimensions labeled on FIG. 16 are as follows:

$y^n$/x=about 0.5 to about 1.0
x/z=about 0.9 to about 1.4
b/x=about 0.2 to about 0.7
a/b=about 0.5 to about 0.9
$y^n$/a=about 2.2 to about 2.6
$y^n$/g=about 1.2 to about 1.7
g/a=about 1.4 to about 1.9
g/z=about 0.4 to about 0.8

Figure 17:
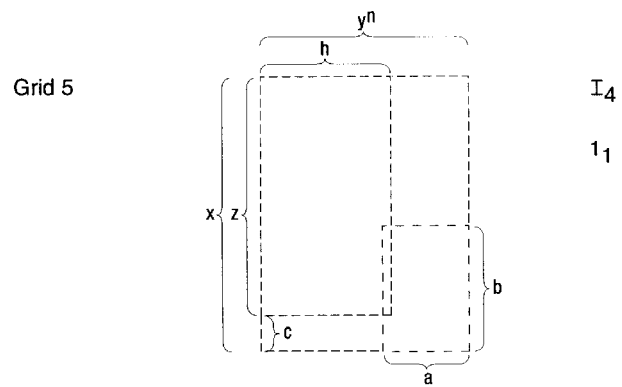
FIG. 17 is a diagram of the present invention as it may be used to display an uppercase sans serif letter "I" and a small numeral "4," the corresponding character in the telephone dialing code, or a large sans serif numeral "1" along with a small numeral "1;"

FIG. 17 (Grid 5) depicts a Medium Configuration grid suitable for displaying the uppercase sans serif letter "I," a large numeral "1," and the small numerals that correspond to each in the telephone dialing code. The following dimensions can be used, for example, in a poster advertisement:

$y^n$=3.40 cm
x=4.45 cm
h=2.10 cm
z=3.85 cm
a=1.40 cm
b=2.05 cm
c=0.55 cm

Preferred relative proportions of the grid dimensions labeled on FIG. 17 are as follows:

$y^n$/x=about 0.5 to about 1.0
x/z=about 0.9 to about 1.4
b/x=about 0.2 to about 0.7
a/b=about 0.5 to about 0.9
$y^n$/a=about 2.2 to about 2.6
$y^n$/h=about 1.4 to about 1.8
h/a=about 1.3 to about 1.7
h/z=about 0.3 to about 0.8

Figure 18:
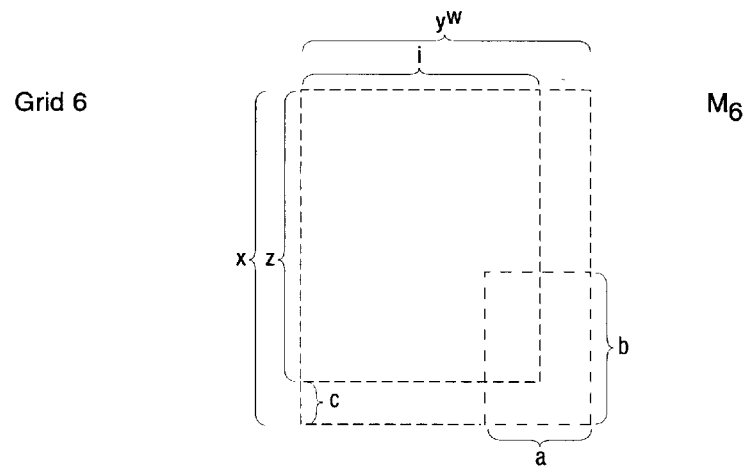
FIG. 18 is a diagram of the present invention as it may be used to display an uppercase sans serif letter "M" and a small numeral "6," the corresponding character in the telephone dialing code.

FIG. 18 (Grid 6) depicts a Medium Configuration grid suitable for displaying the uppercase sans serif letter "M" and a small numeral "6," the corresponding character in the telephone dialing code. The following dimensions can be used, for example, in a poster advertisement:

$y^w$=3.90 cm
x=4.45 cm
i=3.20 cm
z=3.85 cm
a=1.40 cm
b=2.05 cm
c=0.55 cm

Preferred relative proportions of the grid dimensions labeled on FIG. 18 are as follows:

$y^w$/x=about 0.7 to about 1.1
x/z=about 0.9 to about 1.4
b/x=about 0.2 to about 0.7
a/b=about 0.5 to about 0.9
$y^w$/a=about 2.5 to about 3.0
$y^w$/i=about 1.0 to about 1.4
i/a=about 2.1 to about 2.5
i/z=about 0.6 to about 1.0

Figure 19:
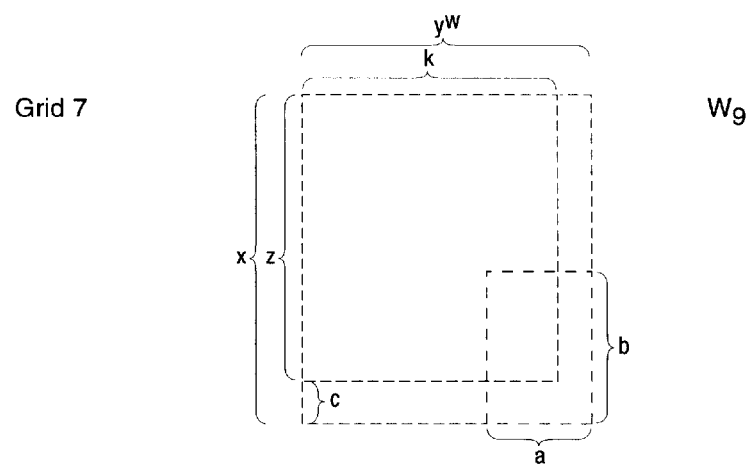
FIG. 19 is a diagram of the present invention as it may be used to display an uppercase sans serif letter "W" and a small numeral "9," the corresponding character in the telephone dialing code.

FIG. 19 (Grid 7) depicts a Medium Configuration grid suitable for displaying the uppercase sans serif letter "W" and a small numeral "9," the corresponding character in the telephone dialing code. The following dimensions can be used, for example, in a poster advertisement:

$y^w$=3.90 cm
x=4.45 cm
k=3.40 cm
z=3.85 cm
a=1.40 cm
b=2.05 cm
c=0.55 cm

Preferred relative proportions of the grid dimensions labeled on FIG. 19 are as follows:

$y^w$/x=about 0.7 to about 1.1
x/z=about 0.9to about 1.4
b/x=about 0.2 to about 0.7
a/b=about 0.5 to about 0.9
$y^w$/a=about 2.5 to about 3.0
$y^w$/k=about 0.9 to about 1.4
k/a=about 2.2 to about 2.7
k/z=about 0.7 to about 1.1

Figure 20A:
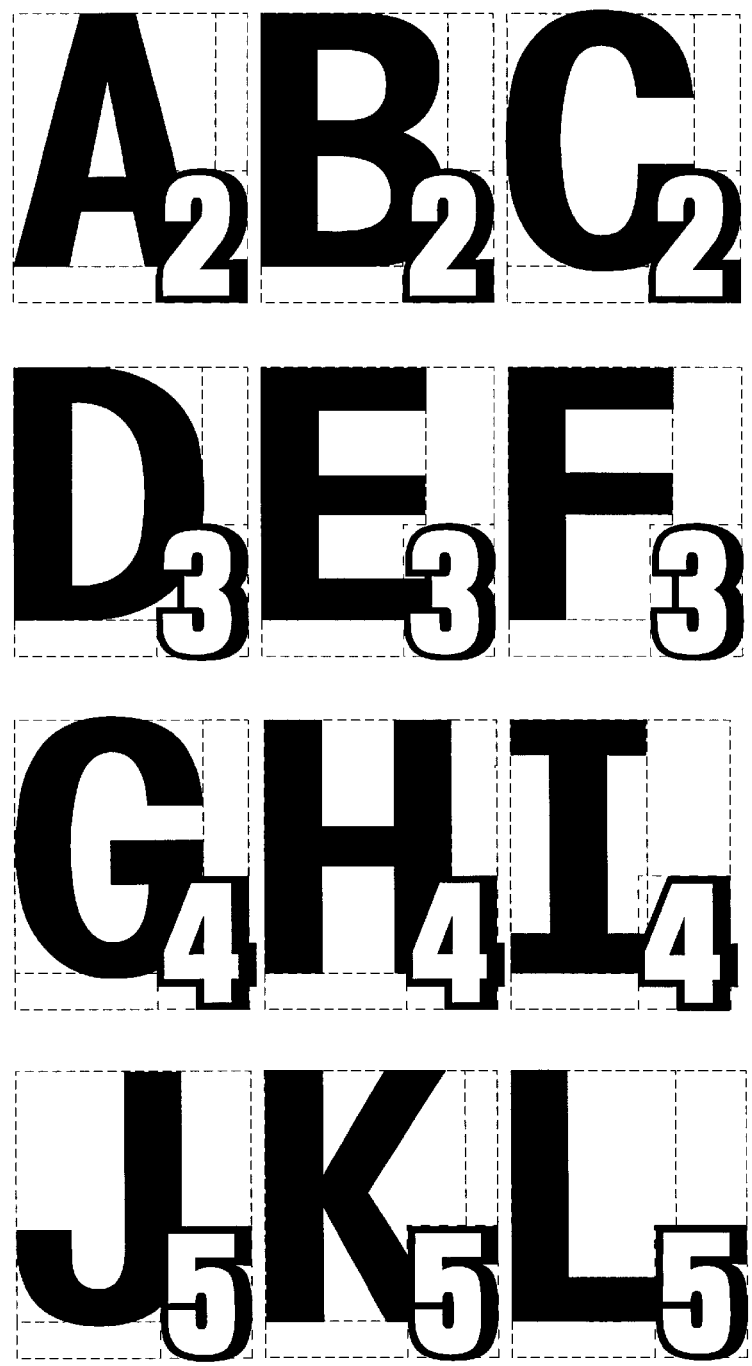
FIG. 20A is a diagram of the present invention as it is used to display, simultaneously, the uppercase sans serif letters "A," "B," "C," "D," "E," "F," "G," "H," "I," "J," "K," "L," of the telephone dialing code, together with their numeric translations.
Figure 20B:
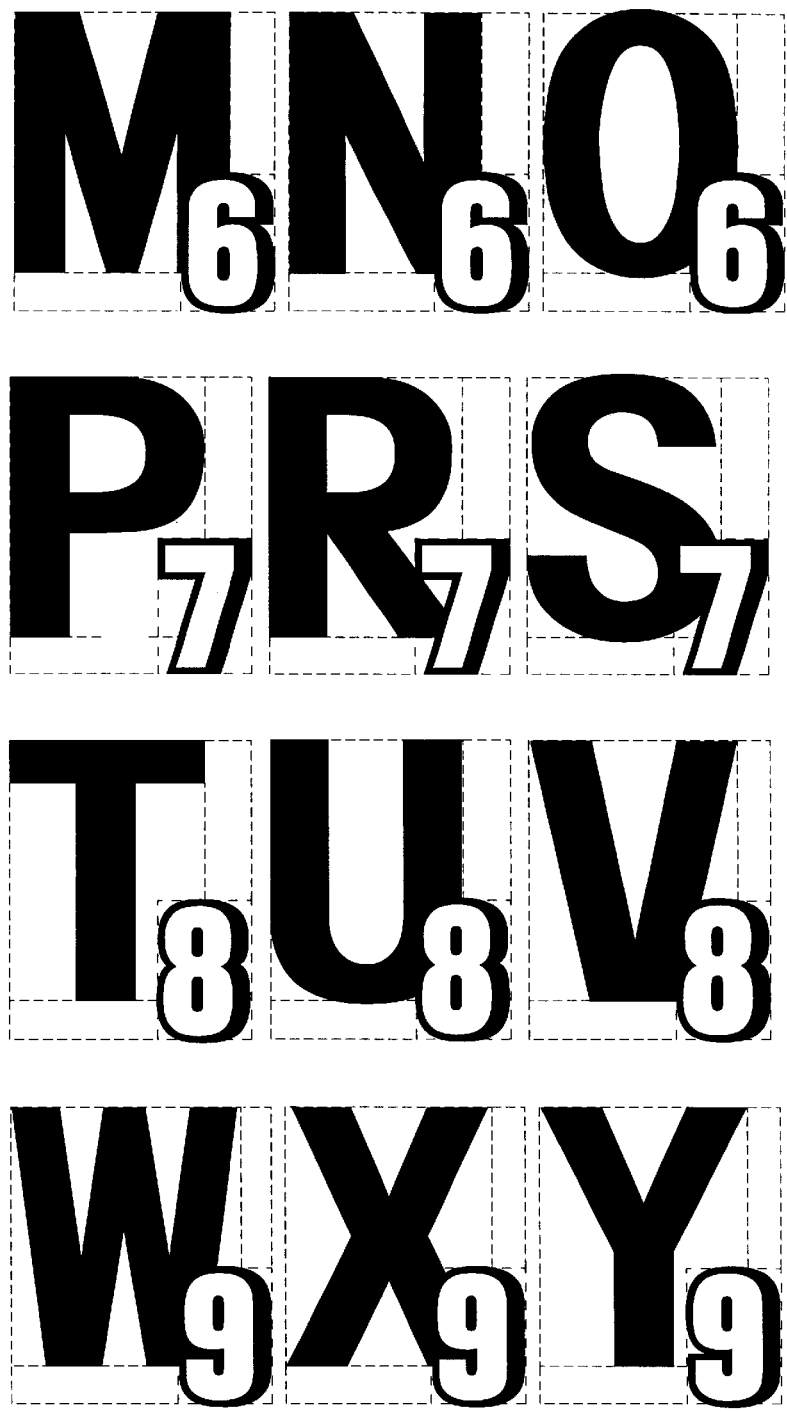
FIG. 20B is a diagram of the present invention as it is used to display, simultaneously, the uppercase sans serif letters "M," "N," "O," "P," "R," "S," "T," "U," "V," "W," "X," "Y," of the telephone dialing code, together with their numeric translations.
Figure 24A:
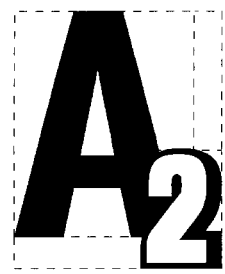
FIG. 24A is a diagram of the present invention as it is used to display an uppercase sans serif "A" shown in positive with a smaller numeral "2" shown in outline.
Figure 24B:
FIG. 24B is a diagram of the present invention as it is used to display an uppercase sans serif "A" shown in reverse with a smaller numeral "2" shown in outline.
Figure 25A:
FIG. 25A is a diagram of a second embodiment of the present invention as it is used to display a lowercase sans serif "a" shown in positive, with a smaller numeral "2" shown in outline.
Figure 25B:
FIG. 25B is a diagram of a second embodiment of the present invention as it is used to display a lowercase sans serif "a" shown in reverse, with a smaller numeral "2" shown in outline.
Figure 26A:
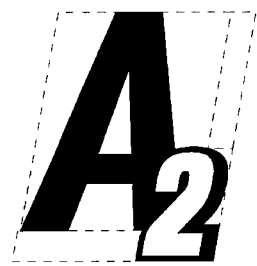
FIG. 26A is a diagram of the present invention as it is used to display an italic uppercase sans serif "A" shown in positive, with a smaller numeral "2" shown in outline.
Figure 26B:
FIG. 26B is a diagram of the present invention as it is used to display an italic uppercase sans serif "A" shown in reverse, with a smaller numeral "2" shown in outline.
Figure 27A:
FIG. 27A is a diagram of a second embodiment of the present invention as it is used to display an italic lowercase sans serif "a" shown in positive, with a smaller numeral "2" shown in outline.
Figure 27B:
FIG. 27B is a diagram of a second embodiment of the present invention as it is used to display an italic lowercase sans serif "a" shown in reverse, with a smaller numeral "2" shown in outline.
Figure 28A:
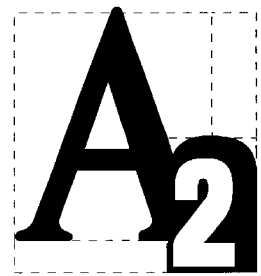
FIG. 28A is a diagram of a third embodiment of the present invention as it is used to display an uppercase serif "A" shown in positive, with a smaller numeral "2" shown in outline.
Figure 28B:
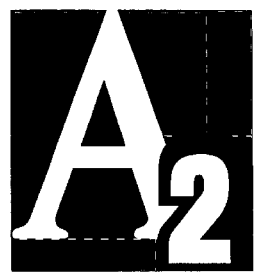
FIG. 28B is a diagram of a third embodiment of the present invention as it is used to display an uppercase serif "A" shown in reverse, with a smaller numeral "2" shown in outline.
Figure 29A:
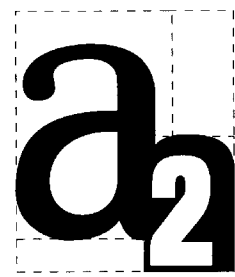
FIG. 29A is a diagram of a fourth embodiment of the present invention as it is used to display a lowercase serif "a" shown in positive, with a smaller numeral "2" shown in outline.
Figure 29B:
FIG. 29B is a diagram of a fourth embodiment of the present invention as it is used to display a lowercase serif "a" shown in reverse, with a smaller numeral "2" shown in outline.
Figure 30A:
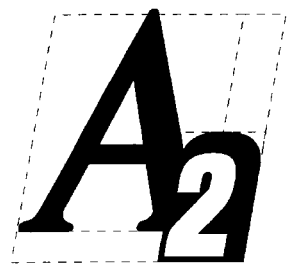
FIG. 30A is a diagram of a third embodiment of the present invention as it is used to display an italic uppercase serif "A" shown in positive, with a smaller numeral "2" shown in outline.
Figure 30B:
FIG. 30B is a diagram of a third embodiment of the present invention as it is used to display an italic uppercase serif "A" shown in reverse, with a smaller numeral "2" shown in outline.
Figure 31A:
FIG. 31A is a diagram of a fourth embodiment of the present invention as it is used to display an italic lowercase serif "a" shown in positive, with a smaller numeral "2" shown in outline.
Figure 31B:
FIG. 31B is a diagram of a fourth embodiment of the present invention as it is used to display an italic lowercase serif "a" shown in reverse, with a smaller numeral "2" shown in outline.
Figure 32:
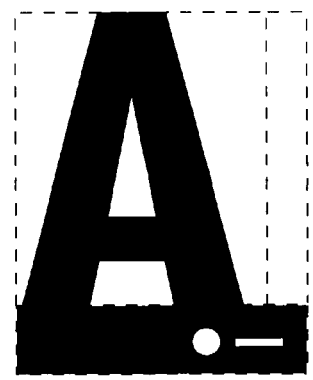
FIG. 32 is a diagram of a fifth embodiment of the present invention as it is used to display an uppercase sans serif "A" with a smaller corresponding American Morse code symbol.
Figure 33:
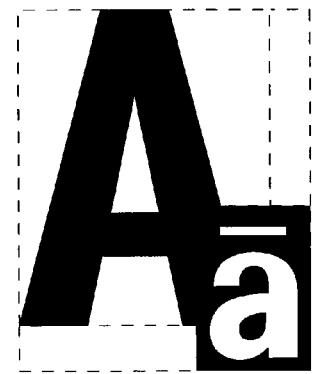
FIG. 33 is a diagram of a sixth embodiment of the present invention as it is used to display an uppercase sans serif "A" with a smaller corresponding phonetic symbol.

FIG. 20A is a diagram of the present invention as it is used to display, simultaneously, the uppercase sans serif letters, "A," "B," "C," "D," "E," "F," "G," "H," "I," "J," "K," "L," of the telephone dialing code, together with their numeric translations;

FIG. 20B is a diagram of the present invention as it is used to display, simultaneously, the uppercase sans serif letters, "M," "N," "O," "P," "R," "S," "T," "U," "V," "W," "X," "Y," of the telephone dialing code, together with their numeric translations;

Taken together, FIGS. 20A and 20B represent the information found on a telephone keypad or rotary dial that makes up the telephone dialing code (see FIG. 3). In the Medium Configuration, as can be seen, the first display area (containing letters) is always overlapped by the second display area (containing numerals) causing most of the letters to be overlapped by their corresponding numerals to a greater or lesser extent. But certain letters, specifically, "F," "P," "T," and "Y," are not overlapped by their corresponding numerals. The grids shown in FIGS. 13 through 19 were used to generate the letters and numerals shown in FIGS. 20A and 20B.

What is claimed is:

1. A method for simultaneously presenting a visible display of first and second corresponding messages as a single graphic presentation on a single medium, so as to enhance the learning of one of the messages from the familiarity of the other message, each message comprising a set of at least two characters setting forth the desired corresponding message, the method comprises a) defining a plurality of overall display fields in the medium, each overall field being defined by an overall parallelogram, which one side of which is an overall baseline side and having a height, measured from that baseline side, and a width, to encompass a character of the first set and a corresponding character of the second set; all of the overall display fields having the same height in the display and the baselines of all of the overall parallelograms in the display extending along a single line;

b) defining wholly within each overall display field a first display area defined by a first parallelogram, which one side of which is a baseline side and having a first height, measured from the first baseline side, and a first width and where each side of the first parallelogram is parallel to a corresponding side of the overall parallelogram, two adjacent sides of the first parallelogram being coextensive with a portion of two adjacent sides of the overall parallelogram, all of the first display areas having the same height in the display and the first baseline sides being parallel to the overall baseline side;

c) defining wholly within each overall display field a second display area defined by a second parallelogram, which one side of which is a second baseline side and having a second height, measured from the second baseline side, and having a second width and where each side of the second parallelogram is parallel to a corresponding side of the overall parallelogram and a corresponding side of the first parallelogram, two adjacent sides of the second parallelogram being coextensive with a portion of two adjacent sides of the overall parallelogram other than the sides partially coextensive with the sides of the first parallelogram; all of the second display areas having the same height in the display and the second baseline sides being parallel to the overall baseline side; and meeting the following parameters:

(i) each pair of said first and second display areas within their overall display field being immediately adjacent each other and being optically in the same juxtaposition within all of the overall display fields in the display; the width of each of the first and second display areas being determined by the respective character within each such first and second display areas, such that each same character has the same width in all first display areas in a given single graphic presentation and each same character has the same width in all second display areas in the single graphic presentation;

(ii) the relative proportion of the width of the first display area to the width of its overall display field is in the range of from about 0.4:1.0 to about 1.0:1.0; the relative proportion of the width of the second display area to the width of its overall display field is in the range of from about 0.2:1.0 to about 0.6:1.0 and the relative proportion of the height of the first display area to the height of the overall display field is in the range of from about 0.6:1.0 to about 0.9:1.0; and the relative proportion of the height of the second display area to the height of the overall display field is in the range of from about 0.3:1.0 to about 0.6:1.0; and the relative proportion of the width of the overall display field to the height of the overall display field is in the range of from about 0.6:1.0 to about 1.1:1.0;

d) placing a visible first character within each of said first display areas, each first character extending from the first baseline and to the full width of each first display area, and a corresponding second character within each of said second display areas, each first and second character extending from its respective baseline and extending the full width between the respective two sides adjacent to the respective baseline side, of its respective display field; the method providing a display having consistent optically equivalent spacing between the pair of characters in each overall display field and among the characters in each message, such that simultaneous comprehension of the two messages within said first display areas and said second display areas is simplified, and learning of one message from the known other message is enhanced by juxtaposing the two sets of corresponding characters in accordance with such parameters.

2. The method of claim 1, wherein the ratio between the width of the first display area to the width of the overall display field is in the range of about 0.4:1.0 to about 0.9:1.0; and the ratio between the width of the second display area to the width of the overall display field is in the range of about 0.3:1.0 to about 0.6:1.0; and the ratio between the height of the first display area to the height of the overall display field is in the range of about 0.6:1.0 to about 0.8:1.0; and the ratio between the height of the second display area to the height of the overall display field is in the range of about 0.4:1.0 to about 0.5:1.0; and the ratio between the width of the overall display field to the height of the overall display field is in the range of about 0.6:1.0 to about 1.1:1.0.

3. The method of claim 1, wherein the ratio between the width of the first display area to the width of the overall display field is in the range of about 0.4:1.0 to about 0.9:1.0; and the ratio between the width of the second display area to the width of the overall display field is in the range of about 0.3:1.0 to about 0.5:1.0; and the ratio between the height of the first display area to the height of the overall display field is in the range of about 0.7:1.0 to about 0.8:1.0; and the ratio between the height of the second display area to the height of the overall display field is in the range of about 0.4:1.0 to about 0.5:1.0; and the ratio between the width of the overall display field to the height of the overall display field is in the range of about 0.7:1.0 to about 1.1:1.0.

4. The method of claim 1, wherein said character in said first display area is a letter and said corresponding character in said second display area is a number.

5. The method of claim 1, wherein said character in said first display area is a number and said corresponding character in said second display area is a letter.

6. The method of claim 1, wherein the second display area overlaps the first display area within the respective overall display area.

7. The method of claim 1, wherein the relative proportion of the height of the first display area to the height of the overall display field is in the range of from about 0.6:1.0 to about 0.8:1.0 and the relative proportion of the height of the second display area to the height of the overall display field is in the range of from about 0.3:1.0 to about 0.5:1.0.

* * * * *